(12) United States Patent
Aras et al.

(10) Patent No.: US 9,192,281 B2
(45) Date of Patent: Nov. 24, 2015

(54) DISHWASHER COMPRISING A STORAGE TANK

(75) Inventors: Nasir Efe Aras, Istanbul (TR); Orhan Atabey, Istanbul (TR)

(73) Assignee: Arcelik Anonim Sirketi, Istanbul (TR)

( * ) Notice: Subject to any disclaimer, the term of this patent is extended or adjusted under 35 U.S.C. 154(b) by 158 days.

(21) Appl. No.: 13/997,657

(22) PCT Filed: Dec. 6, 2011

(86) PCT No.: PCT/EP2011/071910
§ 371 (c)(1),
(2), (4) Date: Oct. 7, 2013

(87) PCT Pub. No.: WO2012/084492
PCT Pub. Date: Jun. 28, 2012

(65) Prior Publication Data
US 2014/0060590 A1    Mar. 6, 2014

(30) Foreign Application Priority Data
Dec. 24, 2010   (TR) .............................. a 2010 10883

(51) Int. Cl.
*A47L 15/42*   (2006.01)
*A47L 15/00*   (2006.01)

(52) U.S. Cl.
CPC ........... *A47L 15/4219* (2013.01); *A47L 15/424* (2013.01); *A47L 15/4206* (2013.01);
(Continued)

(58) Field of Classification Search
CPC .............. A47L 15/424; A47L 15/4206; A47L 15/4219; A47L 15/4208; A47L 15/4291; A47L 15/4242; A47L 15/0057; A47L 2401/20; A47L 2501/05; A47L 2401/22; A47L 2501/02; Y02B 40/46

USPC ......................................................... 134/111
See application file for complete search history.

(56) References Cited

U.S. PATENT DOCUMENTS 3,367,153 A * 2/1968 Brubaker et al. ............ 68/12.21
5,601,660 A * 2/1997 Jeon et al. ....................... 134/10
(Continued)

FOREIGN PATENT DOCUMENTS

DE           4004057 A1    8/1991
DE     102008040653 A1    1/2010
(Continued)

OTHER PUBLICATIONS

International Search Report for PCT/EP2011/071910.

*Primary Examiner* — Michael Barr
*Assistant Examiner* — Rita Adhlakha
(74) *Attorney, Agent, or Firm* — Venjuris PC

(57) ABSTRACT

The present invention relates to a dishwasher (1) comprising a washing tub (2) wherein the items to be washed are placed, a receptacle (3) disposed at the lower portion of the washing tub (2), wherein the water in the washing tub (2) is collected during the washing process, a pump (4) which returns the water accumulated in the receptacle (3) to the washing tub (2), a storage tank (5) wherein the water used in any one washing step of the washing cycle is stored for using in the next washing step or in the next washing cycle, an additional pump (6) providing the water collected in the receptacle (3) to be pumped into the storage tank (5), an additional conduit (7), one end connected to the receptacle (3), the other end to the additional pump (6), at least one inlet port (8) disposed on the receptacle (3), whereto the additional conduit (7) opens and a microfilter (9); disposed at the center of the receptacle (3), that holds the dirt carried with the water passing from the receptacle (3) to the water circulation conduit, the discharge conduit or the additional conduit.

12 Claims, 5 Drawing Sheets

Figure 1:
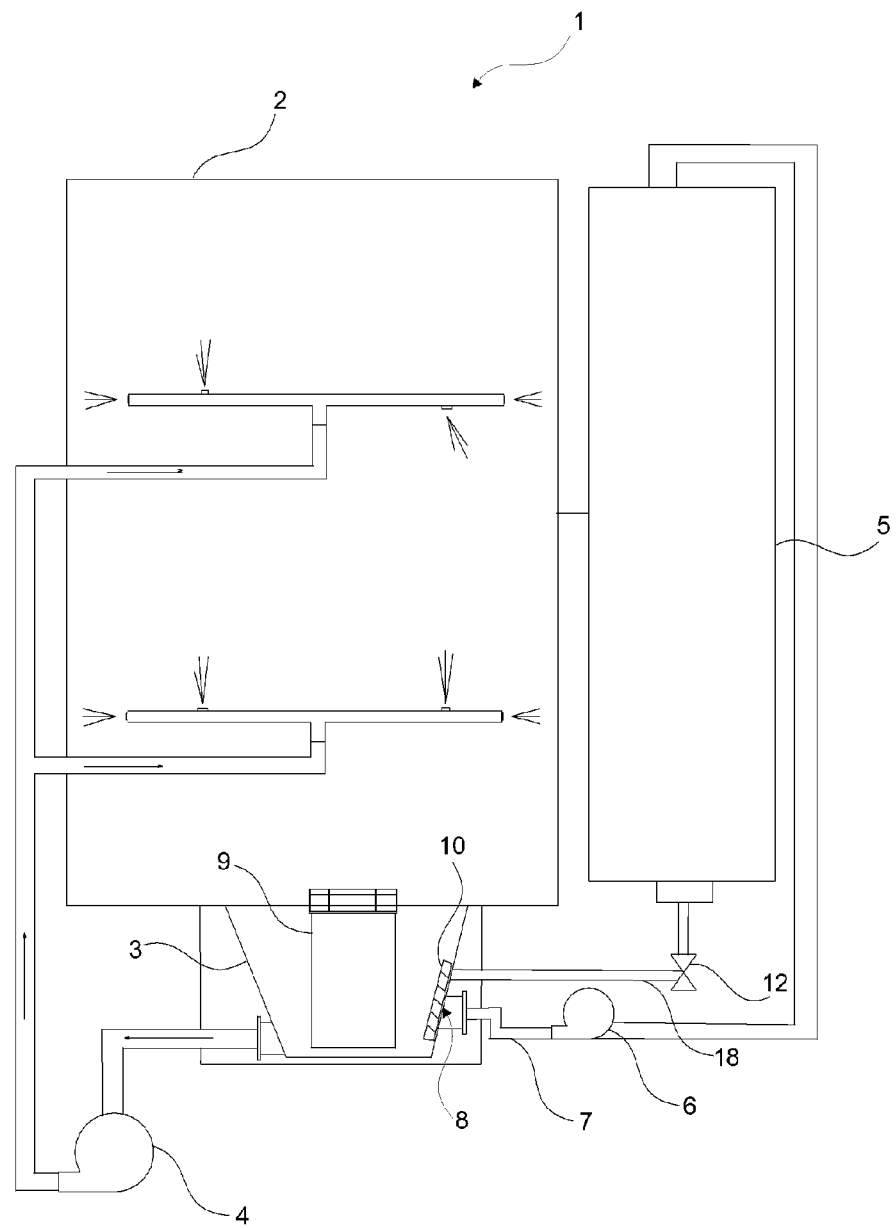

(52) U.S. Cl.
CPC ......... *A47L15/4208* (2013.01); *A47L 15/4242* (2013.01); *A47L 15/4291* (2013.01); *A47L 15/0057* (2013.01); *A47L 2401/20* (2013.01); *A47L 2401/22* (2013.01); *A47L 2501/02* (2013.01); *A47L 2501/05* (2013.01); *Y02B 40/46* (2013.01)

(56) References Cited

U.S. PATENT DOCUMENTS

| | | |
|---|---|---|
| 5,617,885 A | 4/1997 | Centis |
| 5,868,937 A * | 2/1999 | Back et al. .................. 210/651 |
| 2003/0080068 A1 | 5/2003 | Koslow et al. |
| 2007/0251549 A1 | 11/2007 | Heiligenmann et al. |
| 2010/0252081 A1 * | 10/2010 | Classen et al. ................ 134/110 |
| 2011/0132407 A1 * | 6/2011 | Fauth et al. .................. 134/25.2 |

FOREIGN PATENT DOCUMENTS

| | | |
|---|---|---|
| WO | WO 9108700 A1 * | 6/1991 |
| WO | WO 2010010012 A1 * | 1/2010 |

* cited by examiner

DISHWASHER COMPRISING A STORAGE TANK

The present invention relates to a dishwasher comprising a storage tank.

In dishwashers, a washing receptacle is disposed at the underside of the washing tub, wherein the water in the washing tub is collected. The water in the washing receptacle is rotated in the washing tub by means of a pump during the washing step and is discharged at the end of the washing step by a discharge pump.

In the state of the art, it is known that the water collected in the receptacle is not discharged but collected in a storage tank and used in the following steps of washing. Thus, the water that is used in any one step of the washing is reused and water saving is provided.

While water is desired to be stored in order to save water, forming of contamination such as microorganisms, moss etc. is observed in the water waiting in the storage tank in the course of time and bad odors occur. Storing the water in the storage tank hygienically is important in terms of user health.

In the state of the art Patent Document No. EP0669097, a dishwasher is defined as in the preamble of Claim 1.

The aim of the present invention is the realization of a dishwasher comprising a storage tank wherein water is stored in more hygienic conditions.

The dishwasher realized in order to attain the aim of the present invention and explicated in the claims, comprises a storage tank wherein the water collected in the receptacle at the end of any step of the washing cycle is stored by being pumped by means of an additional pump for reusing in the next washing step or in the washing cycle. The dishwasher furthermore comprises an additional conduit providing water to pass from the receptacle to the storage tank, an inlet port disposed on the side wall of the receptacle, through which the additional conduit is connected to the receptacle and a filter that covers the inlet port. The water passed through the microfilter at the center of the receptacle, passes through the filter and flows into the additional conduit and the storage tank. Thus, the water directed to the storage tank is subjected to filtration process twice both by the microfilter and the filter. Thus, the cleanliness level of the water stored in the storage tank is improved.

In an embodiment of the present invention, the filter is of detachable configuration. Thus, the filter can be dismounted by the user and remounted after cleaning when required.

In another embodiment of the present invention, the inlet port is positioned on the side wall of the receptacle such that the inlet port is near the suction orifice of the pump. The water in the additional conduit is provided to be also sucked during suction of the pump and water motion from the additional conduit towards the receptacle occurs. Thus the dirt clinging on the face of the filter facing the receptacle fall off and the filter is provided to self clean.

In another embodiment of the present invention, the water collected in the storage tank is delivered to the receptacle by means of the return conduit extending between the storage tank and the receptacle.

In another embodiment of the present invention, the dishwasher comprises an expansion chamber disposed between the additional conduit, the return conduit and the inlet port and more than one outlet port, disposed over the expansion chamber and connecting the additional conduit and the return conduit with the expansion chamber. Thus, the inlet port connecting the additional conduit to the receptacle is used for connection of the expansion chamber to the receptacle, the need of forming a new opening on the receptacle is not required. Accordingly, labor and cost advantage is provided.

In another embodiment of the present invention, the water in the storage tank is provided to be controllably delivered to the washing tub by means of a valve.

In another embodiment of the present invention, an ozone generator for decontaminating the water in the storage tank from microorganisms and a diffuser disposed inside the storage tank, providing ozone gas generated by the ozone generator to be diffused inside the storage tank are present. Accordingly, hygienic conditions inside the storage tank are improved.

In another embodiment of the present invention, the storage tank is sterilized by emitting UV radiation into the storage tank with a UV source and a UV lamp disposed inside the storage tank and fed by the UV source.

In another embodiment of the present invention, the control unit performs the storage tank cleaning step by providing the additional pump to be operated continuously at the end of a number of cycles determined by the producer. By the additional pump operating continuously, water circulation is provided inside the storage tank and interior of the storage tank is cleaned.

In a version of this embodiment, the storage tank washing step is performed by the hot water collected in the receptacle and transferred to the storage tank after the second rinsing. Thus, cleaning effectiveness of the storage tank is increased.

In another embodiment of the present invention, the waiting duration of the water stored in the storage tank is measured by the control unit, when the waiting duration exceeds a duration determined by the producer, this water is provided to be discharged. Thus, the water delivered from the storage tank to the washing tub is guaranteed to be always clean.

By means of the present invention, the water used in any one step of the washing is provided to be stored under more hygienic conditions in the storage tank for reuse in the following washing steps. Consequently, not only water saving is provided but also hygienic utilization conditions are obtained for the user.

Figure 2:
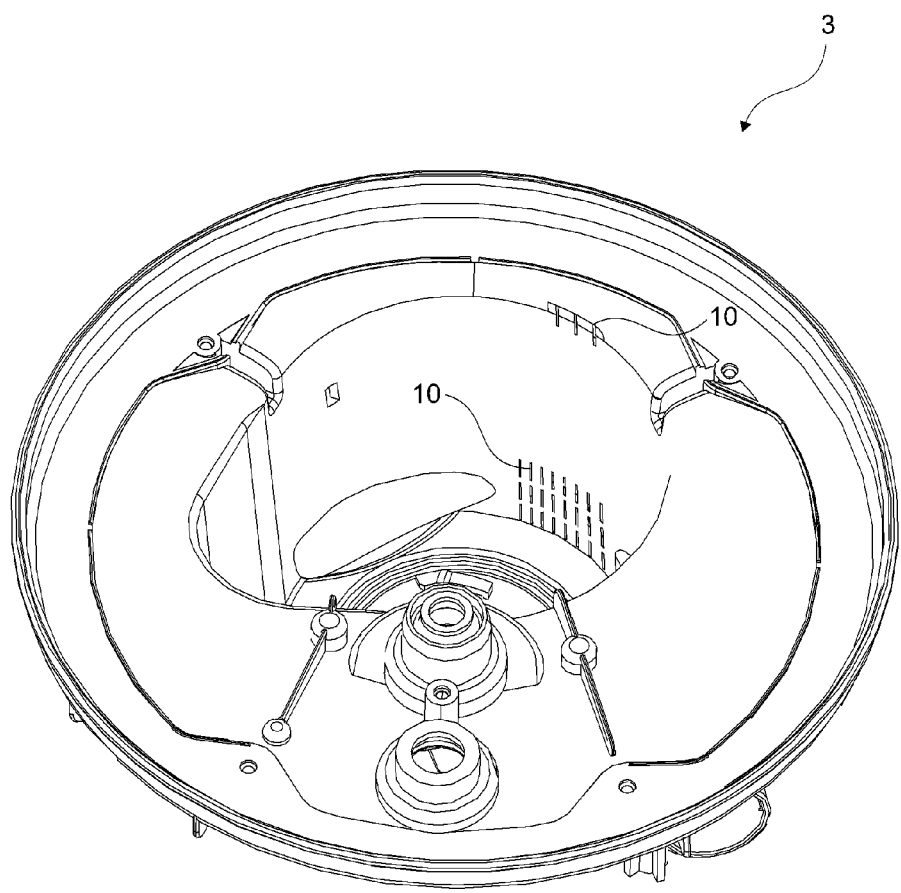
Figure 3:
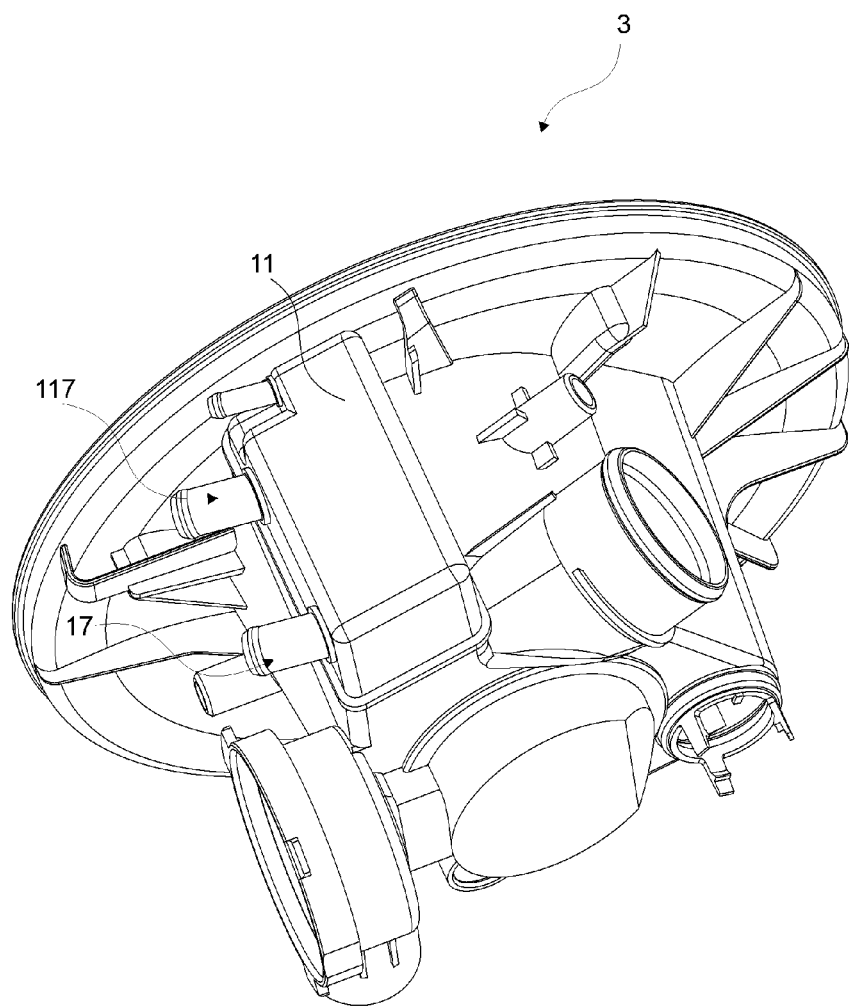
Figure 4:
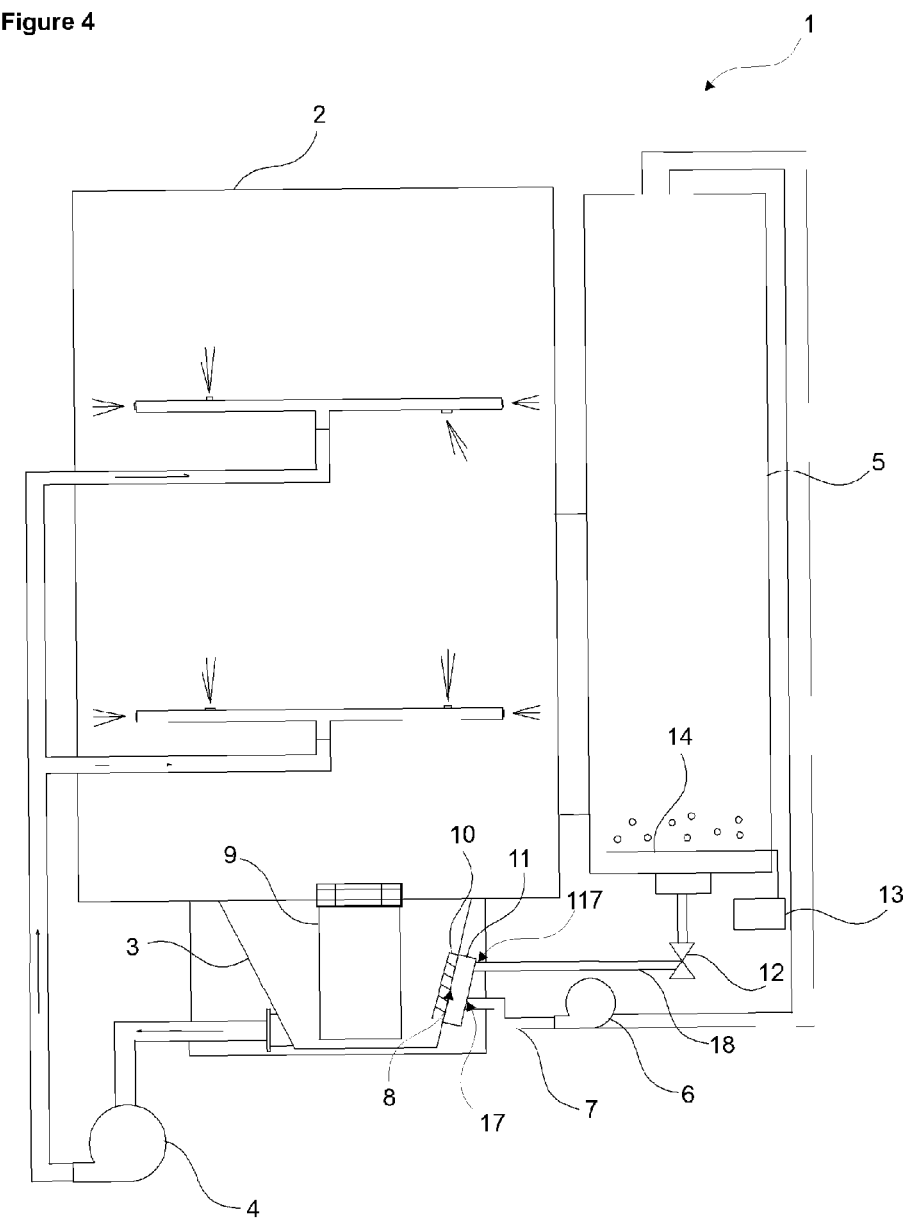
Figure 5:
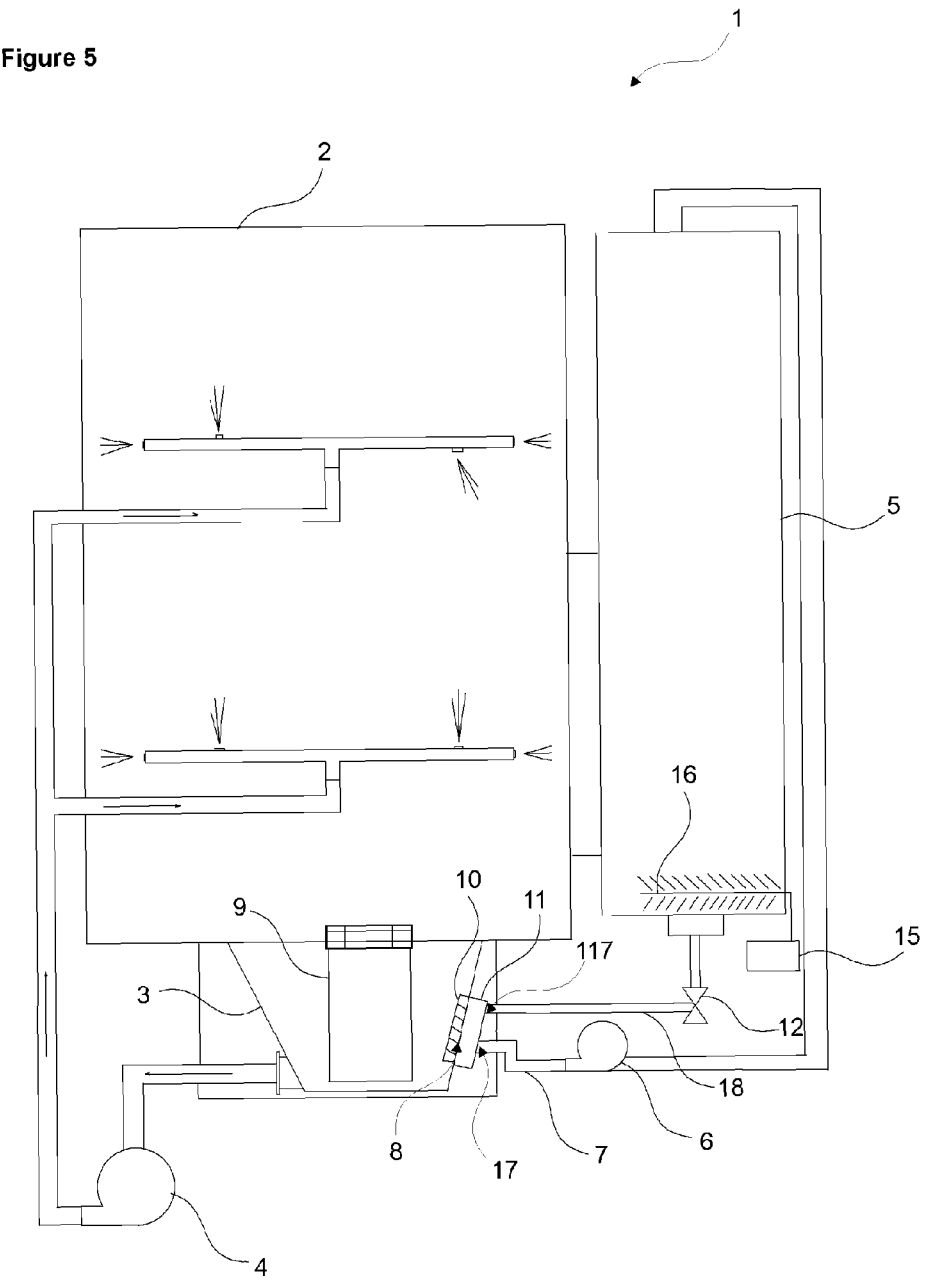

A dishwasher realized in order to attain the aim of the present invention is illustrated in the attached figures, where:

FIG. 1—is the schematic view of a dishwasher.
FIG. 2—is the perspective view of a receptacle.
FIG. 3—is the perspective view of the receptacle related to another embodiment of the present invention.
FIG. 4—is the schematic view of the dishwasher related to another embodiment of the present invention.
FIG. 5—is the schematic view of the dishwasher related to another embodiment of the present invention.

The elements illustrated in the figures are numbered as follows:
1. Dishwasher
2. Washing tub
3. Receptacle
4. Pump
5. Storage tank
6. Additional pump
7. Additional conduit
8. Inlet port
9. Microfilter
10. Filter
11. Expansion chamber
12. Valve
13. Ozone generator
14. Diffuser
15. UV source
16. UV lamp 17. Outlet port
18. Return conduit The dishwasher (1) comprises
- a washing tub (2) wherein the items to be washed are placed,
- a receptacle (3) disposed at the underside of the washing tub (2) wherein the water in the washing tub (2) is collected during the washing process,
- a pump (4) that returns the water collected in the receptacle (3) to the washing tub (2),
- a storage tank (5) wherein the water used in any one washing step of the washing cycle is stored for using in the next washing step or in the next washing cycle,
- an additional pump (6) providing the water collected in the receptacle (3) to be pumped into the storage tank (5),
- an additional conduit (7), one end connected to the receptacle (3), the other end to the additional pump (6),
- at least one inlet port (8) disposed on the receptacle (3), whereto the additional conduit (7) opens,
- a microfilter (9) disposed at the center of the receptacle (3), that holds the dirt carried with the water passing from the receptacle (3) to the water circulation conduit, the discharge conduit or the additional conduit (7).

During washing, the water used for washing the dishes in the washing tub (2) is collected in the receptacle (3), the water collected in the receptacle (3) is sucked by means of the pump (4) and the sucked water after passing through the microfilter (9) is redirected to the washing tub (2) by means of the spray arms. After any one washing step, the additional pump (6) is operated after stopping the pump (4) and the water collected in the receptacle (3) is directed to the storage tank (5). Supplying water from the mains is not required and water saving is provided by using the water passing through the microfilter (9) and stored in the storage tank (5) in the following steps of the washing or in the next washing step.

The dishwasher (1) of the present invention furthermore comprises a filter (10) disposed on the inlet port (8), providing the water passing through the microfilter (9) and directed to the storage tank (5) to be cleaned a second time by passing therethrough. After each washing step, the water passing through the microfilter (9) and collected in the receptacle (3) by operating the additional pump (6), passes to the additional conduit (7) by passing through the filter (10). The additional pump (6) directs the water passing to the additional conduit (7) towards the storage tank (5). The water collected in the storage tank (5) is subjected to filtration process twice by being passed both through the microfilter (9) and also the filter (10). Thus, cleanliness level of the water stored in the storage tank (5) is increased. Furthermore, by means of the filter (10) the problems that may arise due to the microfilter (9) not being mounted properly in place are eliminated. Thus, more hygienic utilization conditions are provided for the user.

The filter (10) can be plastic, wire, carbon or a thinner membrane filter.

In an embodiment of the present invention, the filter (10) is of detachable configuration. Thus, the filter (10) can be dismounted and cleaned by the user at certain periods and again mounted in place. Thus, problems of the filter (10) being clogged etc. in the course of time are prevented.

In another embodiment of the present invention, the inlet port (8) is situated near the suction orifice of the pump (4). During the washing step, a water flow occurs from the additional conduit (7) towards the receptacle (3) when the pump (4) operates, since some amount of water is collected in the additional conduit (7). Meanwhile, a water movement occurs from the additional conduit (7) through the filter (10) towards the receptacle (3). This water movement occurring through the filter (10) provides the dirt clinging on the filter (10) to fall inwards into the receptacle (3). The dirt falling into the receptacle (3) settles on the base of the receptacle (3) due to gravity effect and is discharged by the discharge pump being operated. Thus, the filter (10) is provided to self clean and any user intervention is not required for cleaning the filter (10).

In another embodiment of the present invention, the dishwasher (1) comprises a return conduit (18) with one end connected to the storage tank (5), the other end to the receptacle (3), providing water to pass from the storage tank (5) to the receptacle (3). In the washing steps wherein the water in the storage tank (5) is used, the water in the storage tank (5) reaches the receptacle (3) by passing through the return conduit (18). The water in the receptacle (3) is directed to the washing tub (2) by means of the pump (4).

In another embodiment of the present invention, the dishwasher (1) comprises an expansion chamber (11), disposed between the additional conduit (7), the return conduit (18) and the inlet port (8), that provides water to pass from the receptacle (3) to the additional pump (6) and from the storage tank (5) to the receptacle (3). The water passes through the expansion chamber (11) both while passing from the receptacle (3) to the storage tank (5) by means of the additional conduit (7) and the additional pump (6) and while passing from the storage tank (5) to the receptacle (3) by means of the return conduit (18). The dishwasher (1) furthermore comprises more than one outlet port (17, 117) disposed on the expansion chamber (11), providing the expansion chamber (11) to be connected to the additional conduit (7) and the return conduit (18). Thus, the water used in any one step of the washing cycle and collected in the receptacle (3) is directed to the additional conduit (7) and the storage tank (5) through the expansion chamber (11) by passing from the first outlet port (17). The first outlet port (17) provides the water directed to the storage tank (5) to pass from the expansion chamber (11) to the additional conduit (7). Similarly, the water passing from the storage tank (5) to the return conduit (18) passes from the second outlet port (117) and is delivered to the receptacle (3) through the expansion chamber (11). By using the inlet port (8) for connection of the expansion chamber (11) to the receptacle (3), the need for forming a new opening on the receptacle (3) for the expansion chamber (11) is eliminated. The inlet port (8) provides connection of both the additional conduit (7) and the expansion chamber (11) with the receptacle (3). Thus, the connection of the receptacle (3) with the additional conduit (7) is facilitated. Furthermore, the increase in cost that may arise due to forming a new opening on the receptacle (3) is prevented.

In another embodiment of the present invention, the dishwasher (1) comprises a valve (12) disposed on the return conduit (18), providing the water in the storage tank (5) to be delivered controllably into the washing tub (2). The amount of water delivered from the storage tank (5) to the washing tub (2) is regulated by means of the valve (12).

In another embodiment of the present invention, the dishwasher (1) comprises an ozone generator (13) and a diffuser (14) placed in the storage tank (5), providing the ozone gas leaving the ozone generator (13) to be delivered into the storage tank (5). As ozone gas is delivered into the storage tank (5), the water in the storage tank (5) is decontaminated from the microorganisms therein. Consequently, water is stored in the storage tank (5) in cleaner and more hygienic conditions.

In another embodiment of the present invention, the dishwasher (1) comprises a UV source (15) and a UV lamp (16) disposed in the storage tank (5) that is fed by the UV source (15). By means of the UV lamp (16), the hygiene level of the water collected in the storage tank (5) is increased by emitting UV radiation therein.

In another embodiment of the present invention, the dishwasher (1) comprises a control unit that provides the storage tank (5) washing step to be performed by operating the additional pump (6) continuously at the end of a number of cycles determined by the producer. In the storage tank (5) washing step, the additional pump (6) is operated continuously thus providing circulation of water in the storage tank (5). The dirt clinging to inner walls of the storage tank (5) are removed and discharged by means of the water circulation in the storage tank (5). Consequently, interior of the storage tank (5) is cleaned and contamination of the stored water is prevented.

In a version of this embodiment, the control unit performs the storage tank (5) washing step after the second rinsing step. Cleaning effectiveness of the interior of the storage tank (5) is increased since the water directed from the receptacle (3) to the storage tank (5) after the second rinsing step is hot.

In another embodiment of the present invention, the control unit provides the water collected in the storage tank (5) to be discharged if this water is not used for a time period determined by the producer. The control unit detects the utilization period of the water in the storage tank (5) by means of the time counter disposed thereon. When the water in the storage tank (5) is not used for a time period determined by the producer, the control unit provides the water in the storage tank (5) to pass into the receptacle (3) and to be discharged by means of the discharge pump. Consequently, the moss, microorganisms and dirt that may form due to the water waiting for a long time period in the storage tank (5) is prevented from being delivered to the washing tub (2).

By means of the present invention, the water directed from the receptacle (3) to the storage tank (5) by the additional pump (6) to be used in the following washing steps after passing through the microfilter (9), is provided to be filtered again by the filter (10) disposed on the inlet port (8) situated at the receptacle (3) outlet thus maintaining more hygienic utilization conditions. Furthermore, water saving is provided by storing the water used in any one washing step in the storage tank (5) and reusing in the following washing steps.

It is to be understood that the present invention is not limited to the embodiments disclosed above and a person skilled in the art can easily introduce different embodiments. These different embodiments should also be considered within the scope of the claims of the present invention.

The invention claimed is:

1. A dishwasher (1) comprising:
    a washing tub (2) wherein the items to be washed are placed,
    a receptacle (3) disposed at the underside of the washing tub (2) wherein the washing tub (2) collects water during a washing process,
    a pump (4) that returns the water collected in the receptacle (3) to the washing tub (2),
    a storage tank (5) wherein water used in any one washing step of a washing cycle is stored for using in a next washing step or in a next washing cycle,
    an additional pump (6) providing the water collected in the receptacle (3) to be pumped into the storage tank (5),
    an additional conduit (7), one end connected to the receptacle (3), the other end to the additional pump (6),
    at least one inlet port (8) disposed on the receptacle (3), whereto the additional conduit (7) opens,
    a microfilter (9) disposed at the center of the receptacle (3), that holds the dirt carried with the water passing from the receptacle (3) to a water circulation conduit, discharge conduit or the additional conduit (7)
    and a filter (10) disposed on the inlet port (8), providing the water directed to the storage tank (5) by passing through the microfilter (9) to be cleaned a second time by being passed therethrough,
    a return conduit (18) with one end connected to the storage tank (5), the other end to the receptacle (3), providing water to pass from the storage tank (5) to the receptacle (3) and an expansion chamber (11), disposed between the additional conduit (7), a return conduit (18) and the inlet port (8), that provides water to the pass from receptacle (3) to the additional pump (6) and from the storage tank (5) to the receptacle (3), such that water returning to receptacle (3) from return conduit (18) flows back through filter (10).

2. The dishwasher (1) as in claim 1, wherein the filter (10) is of detachable configuration.

3. The dishwasher (1) as in claim 2, wherein the inlet port (8) is disposed near a suction orifice of the pump (4).

4. The dishwasher (1) as in claim 3, further comprising more than one outlet port (17, 117) disposed on the expansion chamber (11), providing the expansion chamber (11) to be connected to the additional conduit (7) and the return conduit (18).

5. The dishwasher (1) as in claim 4, further comprising a valve (12) disposed on the return conduit (18), providing the water in the storage tank (5) to be delivered controllably into the washing tub (2).

6. The dishwasher (1) as in claim 5 further comprising an ozone generator (13) and a diffuser (14) placed in the storage tank (5), wherein ozone gas leaving the ozone generator (13) is delivered to the storage tank (5).

7. The dishwasher (1) as in claim 5, further comprising a UV source (15) and a UV lamp (16) disposed in the storage tank (5) that is fed by the UV source (15).

8. The dishwasher (1) as in claim 1, wherein the inlet port (8) is disposed near a suction orifice of the pump (4).

9. The dishwasher (1) as in claim 1, further comprising more than one outlet port (17, 117) disposed on the expansion chamber (11), providing the expansion chamber (11) to be connected to the additional conduit (7) and the return conduit (18).

10. The dishwasher (1) as in claim 1, further comprising a valve (12) disposed on the return conduit (18), providing the water in the storage tank (5) to be delivered controllably into the washing tub (2).

11. The dishwasher (1) as in claim 1, further comprising an ozone generator (13) and a diffuser (14) placed in the storage tank (5), wherein ozone gas leaving the ozone generator (13) is delivered to the storage tank (5).

12. The dishwasher (1) as in claim 1, further comprising a UV source (15) and a UV lamp (16) disposed in the storage tank (5) that is fed by the UV source (15).

* * * * *